Jan. 12, 1943. F. A. BALLOU, JR., ET AL 2,308,412
SECURING DEVICE
Filed May 13, 1942
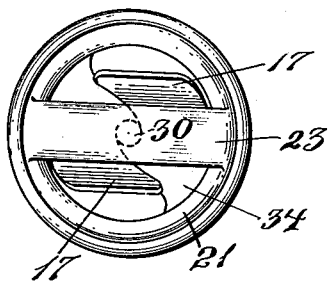
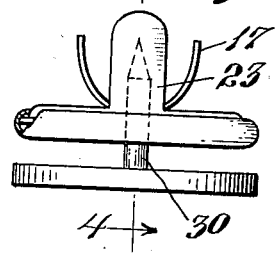
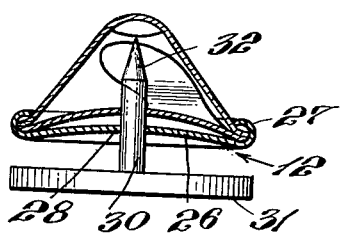
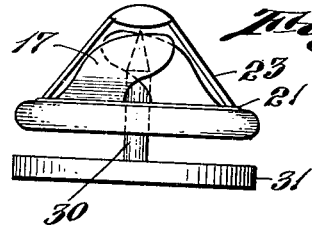
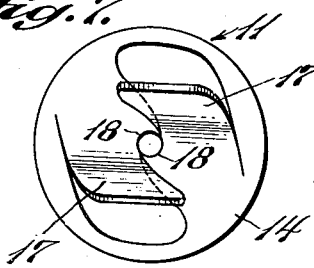
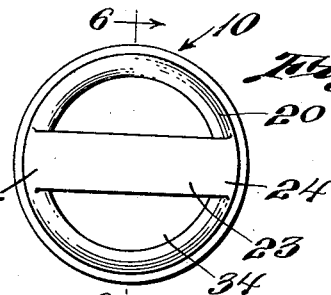
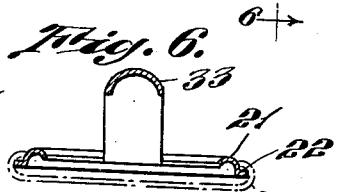
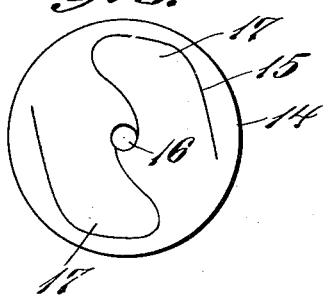
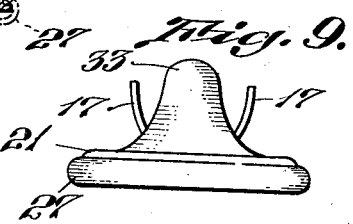
INVENTOR
Frederick A. Ballou Jr.
Melvin W. Moore
BY Barlow & Barlow
ATTORNEYS Patented Jan. 12, 1943

2,308,412

UNITED STATES PATENT OFFICE 2,308,412

SECURING DEVICE

Frederick A. Ballou, Jr., Providence, and Melvin W. Moore, East Providence, R. I., assignors to B. A. Ballou & Co., Inc., a corporation of Rhode Island Application May 13, 1942, Serial No. 442,792

6 Claims. (Cl. 24—217)

This invention relates to a securing device of a type which is especially adapted to grip and hold a shank or stud such for example as a rearwardly projecting shank of a button, and when used for this purpose it is frequently termed a "button back."

One of the objects of this invention is to provide a securing device of this character which will serve as a guard for the end of the shank or stud which it grips to prevent contact with the pointed end of the shank which might cause abrasion either to the hand of the user or to the fabric of clothing with which it might come in contact.

Another object of the invention is to limit the insertion of the shank element into the securing device while at the same time securely holding and gripping the shank to prevent removal of the shank such as through the clothing which it pierces in order to hold a button in position.

Another object of the invention is to provide an effective guard for the shank which is to be gripped while at the same time leaving the clutch operating arms accessible for manual manipulation in the event that it is desired to remove the securing device from the shank.

With these and other objects in view, the invention consists of certain novel features of construction, as will be more fully described and particularly pointed out in the appended claims.

In the accompanying drawing:

Fig. 1 is a top plan view of the securing device;

Fig. 2 is a side elevation of the securing device assembled with the shank of a button;

Fig. 3 is an elevation similar to Fig. 2 but illustrating a view at right angles thereto;

Fig. 4 is a sectional view on substantially line 4—4 of Fig. 2;

Fig. 5 is a top plan view of the guard element of the securing device;

Fig. 6 is a section on line 6—6 of Fig. 5;

Fig. 7 is a top plan view of the clutch element of the securing device;

Fig. 8 is a top plan view of the sheet stock clutch member cut, but before the arms are bent into finished position; and Fig. 9 is a side elevation of the assembly of the securing device with a modified shape of guard provided thereon.

In the use of buttons to be secured to the clothing, it is usual to provide some sort of a device to engage the shank which extends through the cloth, in order to prevent removal of the button and to securely mount the button on the clothing. The device is frequently referred to as a button back, and consists of some means which will clutch the shank and hold the body of the button back firmly secured thereto. Some of the simple assemblies leave the end of the shank exposed which, being pointed, may cause abrasion of other parts of the clothing which come in contact with it, or may scratch the flesh of the wearer in some instances. In overcoming this difficulty we have provided a securing device which although simple in construction will serve as a guard for the end of the shank upon which it is mounted, and thus when in assembled position no abrasion will occur.

With reference to the drawing, it will be observed that the securing device consists of an assembly of three different parts with rolled portions to provide a unit assembly, there being a guard member designated generally 10, a clutch member designated generally 11 and a body member designated generally 12 which serves to hold the other two members in assembled relation.

The clutch member 11 is formed from a sheet of stock cut out in disc shape as at 14 (see Fig. 8) slitted as at 15 in the shape shown in Fig. 8, while there is a pierced hole 16 at the center. Arms 17 are lifted from the sheet stock plate 14 and bent into the position shown in Fig. 7 (see also Figs. 2 and 9) so that when these arms are engaged and moved toward each other the opposite edges 18 of the opening will be spread apart to enlarge the hole 16, and thus free a stud which may be gripped by the edges 18 of this opening.

The guard member 10 consists of an annulus 20 which is shaped in section with a rolled portion 21 and a stepped lip 22 about its periphery, while there is a straplike guard 23 extending from a point 24 on the annulus on one side to a point 25 on the annulus at the other side diametrically across the same. This guard is substantially in the form of an inverted U, or is arched sufficiently so as to receive the shank which will be later described.

The body 12 consists of any suitable rim which may or may not have a bottom as at 26 see Fig. 4; however there is a rim 27 suitable to be rolled about the edges of the disc 14 and the lip 22 of the annulus 20 so as to bind the two members 10 and 11 firmly in assembled position. An opening 28 will be provided in the bottom wall 26 of the body member for the reception of the shank 30 of the button which is to be held. 31 designates any suitable face plate of a button which has extending rearwardly therefrom one or more shanks 30 which are pointed as at 32 so as to extend through fabric or cloth and then have the securing device which we have provided assembled on this shank by merely pressing the same into position over the pointed end 32.

On assembly the arms 17 will flex upwardly due to their inherent resilience as the shank is forced through the opening 16 so as to spread the edges 18 which are of a size to be forced apart by the insertion of the shank therein. Thus the inherent resiliency of the stock will then cause these arms to grip, by reason of their edges 18, the shank 30 and hold the button back assembly securely in position on the shank. The shank point will be beneath the arched straplike guard 23 and will be protected from abrasion.

This guard may also be arched laterally of its length as shown in Fig. 6 at 33 so as to stiffen its construction, and also assist in affording greater protection to the pointed end. This guard also serves as a limit for the amount that the shank may be inserted into the securing device. If it is desired to remove the device from the shank it is merely necessary to grip the two arms 17 which are accessible through the opening 34 of the guard member, and pinch them toward each other which releases the edges 18 from the shank for removal of the securing device. Various different shaped guards may be provided, a different shape being shown in Fig. 9.

Should the shank be positioned into the securing device somewhat out of right angular line the end of the shank would engage the convex guard 33 and be directed to central right angular position.

The guard is between the arms 17 so that when these are moved toward each other they will engage the guard and limit such movement, thus the spring of the arms will not be set by reason of too great a movement.

By rolling the edge of the rim 27 over the lip 22 the edge of the rim will abut the rolled portion 21 and prevent contact of the hand or fabric with this edge which may be sharp or burred.

We claim:

1. A securing device for a shank element comprising a body member having a rim, an inverted U-shape guard extending from a point at one side of the rim to a substantially diametrically opposite point of the rim with openings on either side of said guard, and a clutch carried by said rim having a central opening for the reception of a shank element and provided with a pair of operable arms with one engageable through the opening at one side of the guard and the other engageable through the opening at the other side of the guard.

2. A securing device for a shank element comprising a body member having a rim, an inverted U-shape straplike guard extending from a point at one side of the rim to a substantially diametrically opposite point of the rim leaving openings on either side of said guard, and a clutch carried by said rim having a central opening for the reception of a shank element and provided with a pair of operable arms with one extending into the opening at one side of the guard and the other extending into the opening at the other side of the guard.

3. A securing device for a shank element comprising a body member having a rim, an inverted U-shape straplike guard integral with a rim portion and extending from a point at one side of the rim to a substantially diametrically opposite point of the rim leaving openings on either side of said guard, and a clutch forming a part of the assembly having a central opening for the reception of a shank element and provided with a pair of operable arms with one extending into the opening at one side of the guard and the other extending into the opening at the other side of the guard, said guard being of a width to prevent contact with the shank element when extending through the central opening and held by the clutch.

4. A securing device for a shank element comprising a body member having a rim, a guard member having an annulus coextensive with said rim with a stepped edge and an inverted U-shape guard extending from a point at one side of the annulus to a substantially diametrically opposite point thereof, and a clutch member forming part of the assembly having a central opening for the reception of a shank element and provided with a pair of operable arms extending on either side of said guard and free thereof, said rim provided with a rolled portion to secure together the guard and clutch members with its edge located in the stepped edge of the annulus.

5. A securing device for a shank element comprising a body member having a rim, a guard extending from a point at one side of the rim to a point at least beyond the center of the rim with openings on either side of said guard, and a clutch carried by said rim having a central opening for the reception of a shank element and said clutch element provided with a pair of operable arms with one engageable through the opening at one side of the guard and the other engageable through the opening at the other side of the guard.

6. A securing device for a shank element comprising a body member having a rim, a guard extending from a point at one side of the rim to a point at least beyond the center of the rim with openings on either side of said guard, and a clutch carried by said rim having a central opening for the reception of a shank element and said clutch element provided with a pair of operable arms with one engageable through the opening at one side of the guard and the other engageable through the opening at the other side of the guard, said guard being located between said arms and limiting the movement of the arms toward each other.

FREDERICK A. BALLOU, Jr.
MELVIN W. MOORE.